United States Patent
Evans

(10) Patent No.: US 8,038,168 B2
(45) Date of Patent: Oct. 18, 2011

(54) AUTOMOTIVE P.S.I.R. MILLING BURR CONTROL TAPE

(75) Inventor: Gregg S. Evans, Windsor (CA)

(73) Assignee: Intertec Systems, Troy, MI (US)

( * ) Notice: Subject to any disclaimer, the term of this patent is extended or adjusted under 35 U.S.C. 154(b) by 1569 days.

(21) Appl. No.: 11/415,432

(22) Filed: May 2, 2006

(65) Prior Publication Data

US 2007/0181641 A1 Aug. 9, 2007

Related U.S. Application Data

(60) Provisional application No. 60/676,313, filed on May 2, 2005.

(51) Int. Cl.
*B60R 21/16* (2006.01)

(52) U.S. Cl. ............ 280/728.3; 156/220; 409/131

(58) Field of Classification Search ........... 280/728.3, 280/728.1, 732; 409/131, 132; 156/220; 49/141

See application file for complete search history.

(56) References Cited

U.S. PATENT DOCUMENTS

| 6,312,633 B1 | 11/2001 | Kiesel et al. |
| 2003/0184063 A1 | 10/2003 | Yasuda et al. |

FOREIGN PATENT DOCUMENTS

| EP | 0 893 224 | 1/1999 |
| EP | 1 388 467 | 2/2004 |
| GB | 758242 | 10/1956 |
| JP | 3-110112 | 5/1991 |

*Primary Examiner* — Eric Culbreth

(74) *Attorney, Agent, or Firm* — Dykema Gossett PLLC

(57) ABSTRACT

An injection molded plastic instrument panel P.S.I.R. hidden door milling method including applying a stiff tape, having a hardness greater than a hardness of the plastic instrument panel, to a plastic instrument panel surface to be milled to prevent flexing of the surface during milling. The method may further include milling the surface along a generally width-wise central location of the tape, and removing the tape upon completion of the milling, with the method thereby minimizing burrs along edges of the milled surface. The invention also provides an injection molded plastic instrument panel P.S.I.R. hidden door, and a plastic automotive panel made by method described herein.

15 Claims, 1 Drawing Sheet

AUTOMOTIVE P.S.I.R. MILLING BURR CONTROL TAPE

RELATED APPLICATIONS

This application claims benefit of priority of Provisional Application Ser. No. 60/676,313, filed May 2, 2005, hereby incorporated by reference in its entirety.

BACKGROUND OF INVENTION a. Field of Invention

The invention relates generally to the manufacture of automotive components, and more particularly to a method of weakening a single layer injection molded instrument panel for a Passenger Side Inflatable Restraint (PSIR) hidden door seam, without the seam having characteristic burrs, generally present due to known milling weakening methods.

b. Description of Related Art

When milling soft single layer injection molded instrument panels (primarily of Thermoplastic Polyolefin but also including any blended Poly Propylene material, hereafter referred to as "plastic") in order to weaken the panel for the Passenger Side Inflatable Restraint (PSIR) hidden door seam, the instrument panel PSIR seam may be milled using a milling cutter, as is known in the art. As illustrated in FIG. 1, conventional milling techniques however can produce burrs 4 along the milled surface 6 of the plastic panel 8. These burrs are objectionable, primarily for reasons of eye safety, in that, during passenger air bag deployment, the burrs may become a source of flying projectiles.

The primary reason for the burrs is due to the lack of surface support for the plastic during milling as the milling cutter's edge passes. The plastic near the surface (on the side being milled) flexes due to the lack of supporting material above it, thus preventing the complete cutting of this surface material. The partially uncut surface material may thus include the burrs described above, which are undesirable for the reasons noted above.

For example, U.S. Publication No. 20030184063 discloses a portion of an instrument panel cover (40) around the fracture-opening section (46) (hereinafter referred to as an "opening surrounding portion") that is welded to the reinforcement edge portions (45b) and (45c) of the frame member (45). The opening surrounding portion is prevented from following the opening displacement of the fracture-opening section (46), so that when air bag (43) inflates, the fracture-opening section (46) quickly fractures along fracture grooves (40c) into fracture-opening subsections (46a) and (46b). Therefore, the fracture surfaces (peripheral end surfaces) of the fracture-opening subsections (46a) and (46b) are prevented from having sharp edges or burrs.

JP 03110112 teaches that in order to prevent the creeping of a burr to the rear of a core, and to improve workability by forming a recess to the opening-section corresponding section of the core of a top force, a core (10) for an instrument panel is injection molded from a comparatively hard synthetic resin, and sealing materials (15a-15d) consisting of an air-permeable foaming material are covered in conformity with the shapes of various opening sections such as (11a-11g). The core (10) is set to a top force (22), to which recesses (25) are shaped in response to the core opening sections (11), and a skin (19) to a bottom force (21), and a foaming resin material (30) is introduced into cavities (23) and foam-molded. Residual air and a foamed gas are forced to escape through the sealing materials (15) by cubic expansion, and one part (30A) of the materials flow into the sealing materials (15A) by blowing pressure. The permeation of the sealing materials (15A) of the foaming material and the generation of burrs from the opening sections (11) are prevented by bulging into the recesses (25) and the rise of internal pressure with the bulging.

Further, European Patent Application No. 1388467, European Patent No. 893224, U.S. Pat. No. 6,312,633 and UK Patent Application No. 0758242 disclose other methods for preventing or minimizing burrs in PSIR weakening seams.

As readily evident, while the above-identified Patents and Publications disclose methods for minimizing burrs, the methods nonetheless are clearly complex and thus expensive to implement.

It would therefore be of benefit to provide an economical and efficient method of milling a plastic instrument panel for a PSIR hidden door seam, with the milling resulting in a clean cut surface having virtually no burrs along the edges of the milled surface.

SUMMARY OF INVENTION

The present invention thus solves the problems and overcomes the drawbacks and deficiencies of prior art burr minimization methods by providing an injection molded plastic instrument panel P.S.I.R. hidden door milling method including applying a stiff tape, having a hardness greater than a hardness of the plastic instrument panel, to a plastic instrument panel surface to be milled to prevent flexing of the surface during milling. The method may further include milling the surface along a generally width-wise central location of the tape, and removing the tape upon completion of the milling, with the method thereby minimizing burrs along edges of the milled surface.

For the method described above, the tape may include a thickness of approximately 0.2-0.7 mm, and in a particular embodiment, the tape may include a thickness of approximately 0.5 mm, and be a Melamine tape. Further for a particular milling operation, the milling cutter may include a linear speed of approximately 45 mm/s and a rotational speed of approximately 15,000 rpm.

The invention also provides an injection molded plastic instrument panel P.S.I.R. hidden door. The method of making the injection molded plastic instrument panel P.S.I.R. door may include the step of applying a stiff tape having a hardness greater than a hardness of the plastic instrument panel to a plastic instrument panel surface to be milled in order to prevent flexing of the plastic instrument panel surface during milling. The method may further include milling the surface along a generally width-wise central location of the tape, and removing the tape upon completion of the milling, with the method thereby minimizing burrs along edges of the milled surface.

The invention yet further provides a plastic automotive panel made by the method of applying a stiff tape, having a hardness greater than a hardness of the plastic automotive panel, to a plastic automotive panel surface to be milled to prevent flexing of the surface during milling. The method may further include milling the surface along an area the tape, and removing the tape upon completion of the milling, with the method thereby minimizing burrs along edges of the milled surface.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 2:
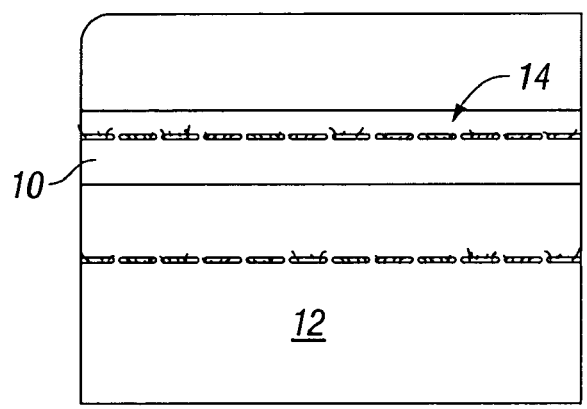
FIG. 2 is an illustration of a plastic test sample after milling with and without stiff tape (prior to tape removal)
Figure 3:
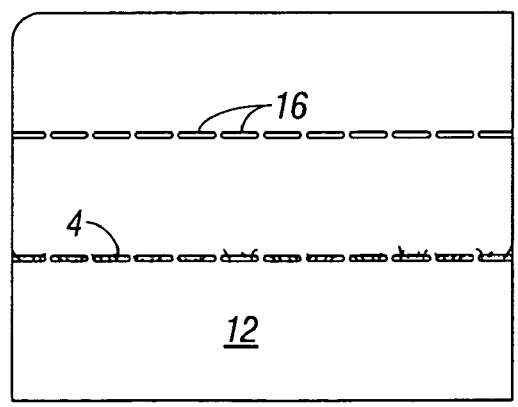
FIG. 3 is an illustration of the test plaque in FIG. 2, after tape removal and air blow-off, illustrating the clean condition achieved with this new method according to the present invention.

Turning now to the drawings wherein like reference characters refer to like and corresponding parts throughout the several views, FIGS. 2 and 3 illustrate various diagrams for the improved plastic instrument panel milling method according to the present invention, generally designated soft plastic milling method.

Figure 1:
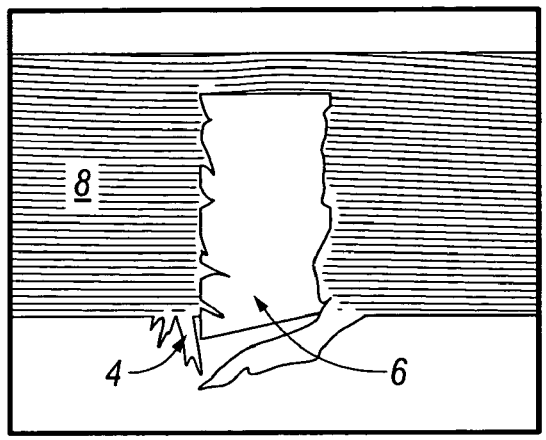
FIG. 1 is an illustration of a plastic instrument panel (sectioned across the milling cutter's path) milled using a conventional milling technique, with the milled surface including burrs along the edges of the surface.

As discussed above, as illustrated in FIG. 1, conventional milling techniques for the milling of plastic instrument panels can produce burrs 4 along the milled surface 6 of the plastic panel 8. These burrs are objectionable, primarily for reasons of eye safety, in that, during passenger air bag deployment, the burrs may become a source of flying projectiles. The primary reason for the burrs is due to the lack of surface support for the plastic during milling as the milling cutter's edge passes. The plastic near the surface (on the side being milled) flexes due to the lack of supporting material above it, thus preventing the complete cutting of this surface material.

In order to prevent flexing of the surface plastic during milling, as shown in FIG. 2, the present invention soft plastic milling method includes the use of a stiff tape 10 disposed on the underside surface of plastic panel 12 along the surface to be milled. The stiff tape may be a 0.2-0.7 mm Melamine strip with an adhesive layer (such as tapes used in plastic desktop veneers, for example), and in an exemplary embodiment of FIG. 2, include a width of approximately 19 mm and thickness of approximately 0.5 mm (and a hardness greater than the injected panel plastic), such that the tape prevents flexing of the injected surface plastic during milling.

With tape 10 applied to the surface of plastic panel 12, the panel may be milled by a standard milling cutter as is known in the art, with the milling cutter (not shown) contacting tape 10 and panel 12 generally along a width-wise central location of tape 10 at 14. For use with the aforementioned stiff tape having a thickness of approximately 0.5 mm, the milling cutter (not shown) may have a recommenced linear speed (i.e. "feed rate") during milling of 45 mm/s and a rotational speed of 15,000 rpm. Use of tape 10 with the recommended milling cutter linear and rotational speeds thus provides the critical surface support required for a clean burr free cut.

With the milling process completed, tape 10 may be removed and the resulting cut surface 16, as shown in FIG. 3, includes no burrs.

The present invention soft plastic milling method thus provides an economical and efficient method of milling a plastic instrument panel for a PSIR hidden door seam, with the milling resulting in a clean cut surface having virtually no burrs along the edges of the milled surface.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. An injection molded plastic instrument panel P.S.I.R. hidden door milling method comprising:
    applying a stiff tape, having a hardness greater than a hardness of the plastic instrument panel, to a plastic instrument panel surface to be milled to prevent flexing of the surface during milling;
    milling the surface along a generally width-wise central location of the tape; and
    removing the tape upon completion of the milling, said method thereby minimizing burrs along edges of the milled surface.

2. An injection molded plastic instrument panel P.S.I.R. hidden door milling method according to claim 1, wherein the tape includes a thickness of approximately 0.2-0.7 mm.

3. An injection molded plastic instrument panel P.S.I.R. hidden door milling method according to claim 1, wherein the tape includes a thickness of approximately 0.5 mm.

4. An injection molded plastic instrument panel P.S.I.R. hidden door milling method according to claim 1, wherein the tape is a Melamine tape.

5. An injection molded plastic instrument panel P.S.I.R. hidden door milling method according to claim 1, wherein a milling cutter for the milling method has a linear speed of approximately 45 mm/s and a rotational speed of approximately 15,000 rpm.

6. An injection molded plastic instrument panel P.S.I.R. hidden door made by the method of:
    applying a stiff tape, having a hardness greater than a hardness of the plastic instrument panel, to a plastic instrument panel surface to be milled to prevent flexing of the surface during milling;
    milling the surface along a generally width-wise central location of the tape; and
    removing the tape upon completion of the milling, said method thereby minimizing burrs along edges of the milled surface.

7. An injection molded plastic instrument panel P.S.I.R. hidden door according to claim 6, wherein the tape includes a thickness of approximately 0.2-0.7 mm.

8. An injection molded plastic instrument panel P.S.I.R. hidden door according to claim 6, wherein the tape includes a thickness of approximately 0.5 mm.

9. An injection molded plastic instrument panel P.S.I.R. hidden door according to claim 6, wherein the tape is a Melamine tape.

10. An injection molded plastic instrument panel P.S.I.R. hidden door according to claim 6, wherein a milling cutter for the milling method has a linear speed of approximately 45 mm/s and a rotational speed of approximately 15,000 rpm.

11. A plastic automotive panel made by the method of:
    applying a stiff tape, having a hardness greater than a hardness of the plastic automotive panel, to a plastic automotive panel surface to be milled to prevent flexing of the surface during milling;

milling the surface along an area the tape; and removing the tape upon completion of the milling, said method thereby minimizing burrs along edges of the milled surface.

12. A plastic automotive panel according to claim 11, wherein the tape includes a thickness of approximately 0.2-0.7 mm.

13. A plastic automotive panel according to claim 11, wherein the tape includes a thickness of approximately 0.5 mm.

14. A plastic automotive panel according to claim 11, wherein the tape is a Melamine tape.

15. A plastic automotive panel according to claim 11, wherein a milling cutter for the milling method has a linear speed of approximately 45 mm/s and a rotational speed of approximately 15,000 rpm.

* * * * *